United States Patent [19]
Woods

[11] Patent Number: 5,325,931
[45] Date of Patent: Jul. 5, 1994

[54] CHUCK ASSEMBLY FOR A DRILL BOX OF A MINE DRILL

[75] Inventor: Gerald L. Woods, Bedford, Pa.

[73] Assignee: Kennametal Inc., Latrobe, Pa.

[21] Appl. No.: 113,568

[22] Filed: Aug. 27, 1993

[51] Int. Cl.⁵ .................... B23B 31/20; B23B 31/165; B23B 31/173; E21B 3/00
[52] U.S. Cl. ..................................... 175/257; 299/48; 299/52
[58] Field of Search ............... 175/257, 195, 260, 262; 279/2.04, 2.01, 2.1, 42, 43.2, 48, 52, 53

[56] References Cited

U.S. PATENT DOCUMENTS

| | | | |
|---|---|---|---|
| 2,885,211 | 5/1959 | Sima | 279/59 |
| 3,227,230 | 1/1966 | Lagerstrom | 175/257 X |
| 3,451,686 | 6/1969 | Hammond | 279/51 |
| 4,640,517 | 2/1987 | Lovatt | 279/2.04 |
| 4,817,972 | 4/1989 | Kubo | 279/42 |
| 4,878,549 | 11/1989 | Bennet | 175/260 X |
| 5,032,043 | 7/1991 | Hollifield | 279/48 X |

Primary Examiner—Stephen J. Novosad
Attorney, Agent, or Firm—James G. Porcelli

[57] ABSTRACT

This invention relates to a chuck assembly for a drill box of a mine drill for releasably securing a mining tool including a working end and a depending rod-like member for roof bolting and roof and face drilling operations and a method of using the chuck assembly. The drill box includes a source of rotary power and a drive member operatively connected to the source of rotary power to rotatably drive the chuck assembly. The chuck assembly includes a spindle, a collet closer and a collet. The spindle is operatively connected to the drive member and has a sleeve of a cylindrical shape including a threaded collar end and a bottom end and an opening extending a selected distance from the collar end to the bottom end. The collet closer includes an annular housing having an aperture threaded for threadingly engaging the threaded collar end of the spindle. The collet includes a forward end portion and an opposing tapered rear end portion and an internal bore capable of receiving the rod-like member of the mining tool. The collet extends a selected distance within the opening of the sleeve such that the collet closes uniformly around the rod-like member of the mining tool as the collet is compressed within the opening of the sleeve by the action of the collet closer threadingly engaging the threaded collar end.

20 Claims, 2 Drawing Sheets

CHUCK ASSEMBLY FOR A DRILL BOX OF A MINE DRILL

FIELD OF THE INVENTION

This invention relates to a chuck assembly for a drill box of a mine drill. More particularly, this invention relates to a chuck assembly for a drill box of a mine drill for releasably securing a mining tool therein for roof bolting and roof and face drilling operations and a method of using the chuck assembly.

BACKGROUND OF THE INVENTION

This invention is concerned with a chuck assembly for a drill box of a mine drill for releasably securing a mining tool of a type having a working end and a depending rod-like member. As used herein the term "mine drill" refers to a mining machine for rotatably powering the mining tool. Examples of well known mining tools commonly utilized in a mine drill include roof bolts and wrenches for roof bolting operations and drill bits for roof and face drilling operations and the like. The mining tool is operatively connected to the drill box of the mine drill through a male/female mechanical coupling, e.g., an end of the rod-like member includes a male fitting to engage a similarly configured female fitting associated with the drill box of the mine drill. In operation, rotary power is transferred to the mining tool through the mechanical coupling of the rod-like member of the mining tool to the drill box of the mine drill.

Heretofore known drill boxes of the mine drill require the coupling type mechanical connection as previously described to transfer rotary power to the mining tool. It will be appreciated that because the known mine drills require a coupling type mechanical connection, different mining tools having different size male fittings may not be used on the same mine drill without the use of an adaptive coupling to provide a proper fit and mechanical interlock. Accordingly, to provide a proper fit and mechanical interlock between a selected size female fitting of a drill box and a different size male fitting of a mining tool, the drill box of the mine drill may either be substituted with a different drill box having an appropriately sized female fitting or the female fitting of the drill box or the mine drill may be replaced with an appropriately sized fitting to accommodate the male fitting of the rod-like member. Substitution of the drill box of the mine drill or replacement of a female fitting of the drill box of the mine drill results in excessive down time in the drilling operation and contributes to inefficiency in the drilling of a work surface or installation of a mine roof bolt in the face of a mine.

In addition to the foregoing problems, in many instances, during the drilling operation or the installation of a mine roof bolt the rod-like member becomes disconnected from the drill box of the mine drill due to the rod-like member deflecting during the drilling operation because the axis of the hole formed by the drilling operation is not aligned with the central axis of the female fitting of the drill box of the mine drill. Once the rod-like member becomes disconnected from the drill box of the mine drill the rod-like member may become lodged within the drilled hole such that the only method of removing the rod-like member from the drilled hole is to reconnect the rod-like member to the drill box of the mine drill and reverse power the rod-like member from the drilled hole. Reattachment of the drill box of the mine drill to the rod-like member is a cumbersome and time consuming process that requires that the female fitting and the male fitting be manually axially aligned, often, in close quarters.

Each of the foregoing problems, along with numerous other problems inherent in the mechanical coupling arrangement of the prior mine drills and mining tools are known to adversely effect the speed and efficiency of operatively connecting a mining tool to the drill box of the mine drill thereby adversely effecting mining productivity.

The present invention, intended to address the problems of the prior art, includes a chuck assembly that may be used with a drill box of a mine drill such as a mine roof or rib bolting machine or a face drilling machine to directly grip the rod-like member of the mining tool instead of using a mechanical coupling arrangement. The chuck assembly in accordance with the present invention also allows the same drill box of a mine drill to utilize a variety of diametrical sizes and cross sectional configurations of rod-like members without need for the use of an adaptive coupling or for changing the male coupling of the rod-like member.

The chuck assembly in accordance with the present invention also mechanically aligns the rod-like member axis with respect to the axis of the drill box of the mine drill without requiring that the axes of the rod-like member and the drill box of the mine drill be manually aligned and that each male/female mechanical coupling be manually connected as previously performed. The chuck assembly allows for the rapid mechanical alignment of the drill box of the mine drill and the rod-like member by collapsing the chuck assembly uniformly around the rod-like member with sufficient force to grip the rod-like member evenly thereby automatically aligning the axes of the rod-like member and the drill box of the mine drill to enable the rod-like member to be rotated or removed from the drilled hole as desired.

SUMMARY OF THE INVENTION

Briefly, according to this invention, there is provided a novel chuck assembly for a drill box of a mine drill for releasably securing a mining tool therein for roof bolting and roof and face drilling operations and a method of using the chuck assembly. The drill box of the mine drill includes a source of rotary power and a drive member operatively connected to the source of rotary power to rotatably drive the chuck assembly having releasably secured therein a mining tool including a working end and a depending rod-like member. The chuck assembly in accordance with the present invention includes a spindle, a collet closer and a collet.

The spindle is operatively connected to the drive member and includes a sleeve of a cylindrical shape having a threaded collar end and a bottom end and an opening extending a selected distance from the collar end to the bottom end. In a preferred embodiment, the opening extends completely from the collar to the bottom end and is tapered a selected distance from the collar to the bottom end. The sleeve may also include a thrust washer fixed transverse the longitudinal length of the opening to prevent the rod-like member from projecting beyond the bottom end of the sleeve.

The collar of the sleeve may include a flange projecting radially outwardly from the collar end adapted to support the chuck assembly within a cavity formed in the drive member. The flange includes a ring member depending downwardly from a bottom surface of the flange that is rotatable within a groove formed on the top of the drive member to seal the spindle with respect to the drive member.

The collet closer of the chuck assembly includes an annular housing having an aperture threaded for threadingly engaging the threaded collar end of the spindle. The annular housing of the collet closer includes a radially outwardly extending flange having circumferentially spaced fingers and the threaded aperture of the collet closer includes a detent ring for engaging an underside of a rim formed around a forward end portion of the collet to retain the collet in a fixed position relative to the collet closer. The aperture is partially threaded and of a stepped cross-sectional profile to provide an edge for engaging the forward end portion of the collet as the collet closer is threaded onto the collar end.

The collet of the chuck assembly has a forward end portion and an opposing tapered rear end portion and an internal bore capable of receiving the rod-like member of the mining tool. The collet is positioned to extend a selected distance within the opening of the sleeve such that the collet closes uniformly around the rod-like member of the mining tool as the collet is compressed within the opening of the sleeve by the action of the collet closer threadingly engaging the threaded collar end.

In operation, the spindle of the chuck assembly as previously described is operatively connected to the drill box. The collet is then positioned within the opening of the sleeve. The collet closer is then positioned for threadingly engaging the threaded collar end of the spindle. Next the rod-like member of the mining tool is inserted through the aperture of the collet closer into the internal bore of the collet and
the collet closer is threaded on the collar end thereby compressing the collet within the opening of the sleeve to force the collet to close uniformly around the rod-like member of the mining tool. The collet closer may be threaded onto the collar end of the sleeve by fixing the rotation of the collet closer and then rotating the spindle to threadingly engage the collet closer. After the collet is uniformly compressed around the rod-like member the collet closer is released and allowed to rotate freely with the spindle as the spindle is power rotated by the drill box of the mine drill.

BRIEF DESCRIPTION OF THE DRAWINGS

Further features and other objects and advantages of this invention will become clear from the following detailed description made with reference to the drawings in which.

DESCRIPTION OF THE PREFERRED EMBODIMENTS

Figure 1:
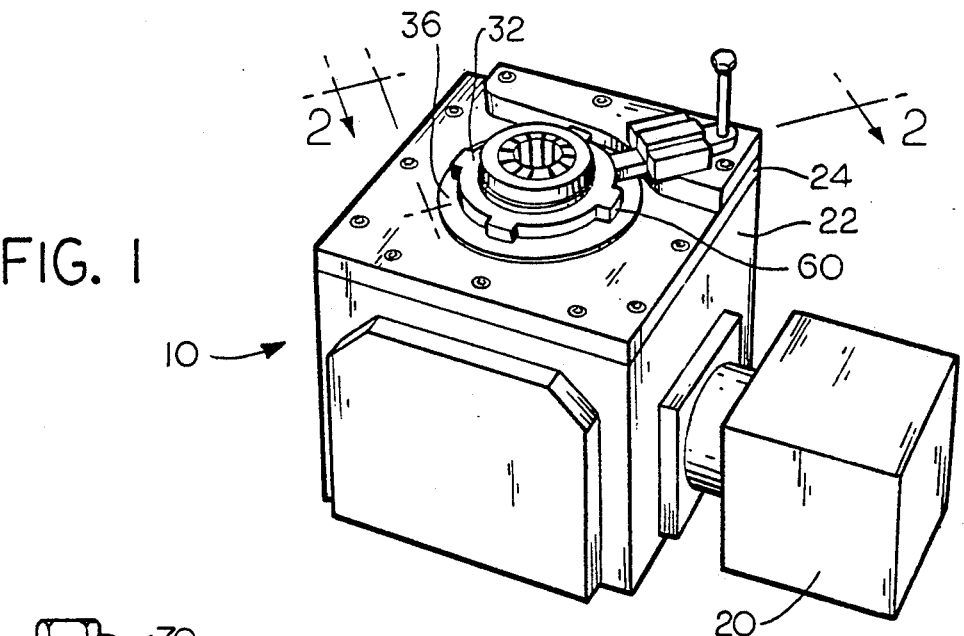
FIG. 1 is an isometric view of a mine drill including a chuck assembly in accordance with the present invention.

Referring to the drawings, wherein like reference characters represent like elements it is to be understood that terms such as "upper", "lower" and similar terms of position and/or direction refer to the illustrations in the drawings and are used for convenience in description and reference and not intended to limit the scope of the present invention.

Figure 2:
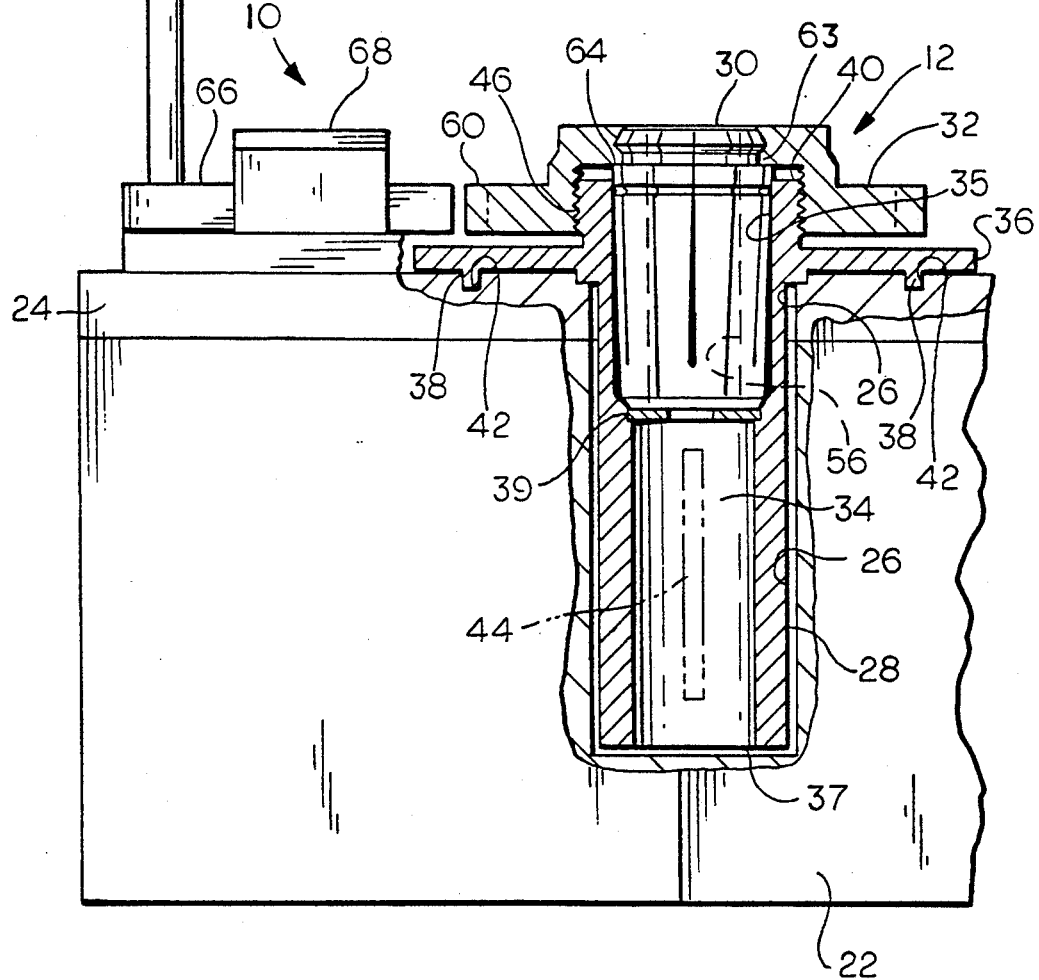
FIG. 2 is a cross-sectional view of the mine drill of FIG. 1 taken about line 2—2.
Figure 3:
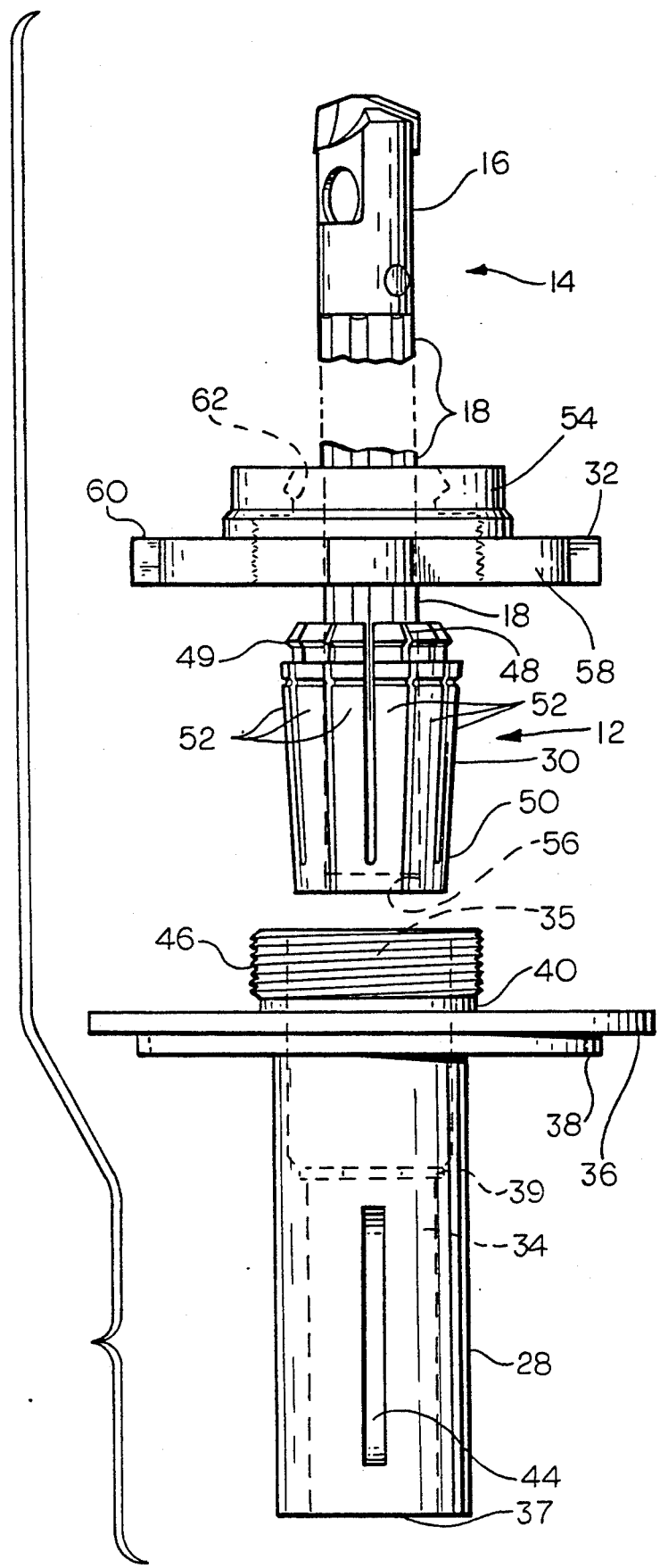
FIG. 3 is an exploded isometric view of the chuck assembly of FIG. 1.

FIGS. 1-3 illustrate a drill box 10 and a chuck assembly 12 of a larger mine drill (not shown) in accordance with the present invention. The mine drill may be either a hydraulically or pneumatically operated mine face drilling machine or a hydraulically or pneumatically operated mine roof or rib bolting machine as is well known in the art. For example, the mine drill may be a Fletcher model DDO or model RR2 mine drill box or an Eimco model 320, model 370 or model 3510 mine drill box.

Releasably secured within the chuck assembly 12 of the mine drill box 10 of the mine drill is a mining tool 14. The mining tool 14 includes a working end 16 and a depending rod-like member 18. The rod-like member 18 of the mining tool 14 may be of most any suitable diameter and cross-sectional shape and the working end 16 may be of most any sort designed for the intended function to be performed. For example, as shown in FIG. 3, the mining tool 14 may include a hollow rod-like member 18 having a hexagonal cross-sectional shape made of a suitable material and a rotary drill bit of conventional design secured to one end of the rod-like member for drilling holes in a work surface such as a rock strata in the roof of a mine entry for installing roof bolts or receiving explosive charges. It will be appreciated that the rod-like member may also consist of the rod-like member of a mine roof bolt of conventional design for supporting a portion of a mine roof.

The mine drill box 10 of the mine drill generally includes a drive member 22 operatively connected to a source of rotary power 20 to rotatably drive the chuck assembly 12. The source of rotary power 20 contains a hydraulic motor (not shown) sealed within a suitable container. The hydraulic motor is sealed within a container to prevent debris and the like from interfering with the operation of the hydraulic motor. The hydraulic motor is operatively connected to the drive member 22 and in turn to the chuck assembly 12 through a suitable mechanical linkage or drive system (not shown) to transfer rotary power from the hydraulic motor to the chuck assembly 12. It will be appreciated that the drive member 22 also is enclosed within a suitable sealed container having a removable cover 24 to prevent debris and the like from interfering with the operation of the drive member. For purposes of conciseness and clarity further details of the construction and operative connection between the source of rotary power 20 and the drive member 22 are not provided in view of such details being conventional and generally known by one skilled in the art.

Supported within a cavity 26 formed within the cover 24 of the drive member 22 is the chuck assembly 12. The chuck assembly 12 includes a spindle 28, a collet 30 and a collet closer 32.

The spindle 28 generally includes a sleeve 34 having a flange 36 and a collar 40. The sleeve 34 is of a cylindrical shape including an opening 35 extending a selected distance from the collar 40 to a bottom end 37 of the sleeve. In a preferred embodiment, the opening 35 extends the longitudinal length of the sleeve from the collar 40 to the bottom end 37 of the sleeve. The opening 35 of the sleeve 34 may be tapered from the collar 40 downward a selected distance to the bottom end 37 of the sleeve. The opening 35 allows debris and the like resulting from the drilling operation to be evacuated through the rod-like member 18 and through the drill box as is known in the art. Adjacent the lowermost extent of the tapered opening 35 of the sleeve is a thrust washer 39 fixed transverse the longitudinal length of the opening 35 to prevent further downward advancement of the rod-like member 18 within the sleeve 34. In an alternative embodiment, the thrust washer 39 may be incorporated as part of the collet 30. Formed about the circumference of the sleeve 34 are spaced vertical slots 44 to engage the mechanical linkage and transfer rotary power from the axle through the mechanical linkage to the spindle 28.

Surrounding the upper end of the sleeve 34 is the collar 40. The collar 40 may be formed as part of the sleeve 34 or the collar may be formed as a separate member and attached to the sleeve. The collar 40 has formed about the periphery of the outer surface thereof threads 46 to engage the collet closer 32 as more fully described herein. In a preferred embodiment, the threads 46 of the collar end 40 are positioned above the top surface of the cover 24 of the drive member 22.

Secured to the periphery of the collar 40 of the sleeve 34 is a flange 36. The flange 36 is of a disk shape and projects radially outwardly from the lower end of the collar 40. A ring member 38 depends downwardly from the bottom surface of the flange 36. As assembled, the sleeve 34 of the spindle 28 is positioned within the cavity 26 formed within the cover 24 of the container of the drive member 22 such that the flange 36 of the spindle rotates above the cavity and the ring member 38 rotates within a circular groove 42 formed in the cover 24 of the container thereby sealing the outer circumference of the spindle 28 with respect to the container and supporting the spindle within the cavity of the drive member.

Seated within the opening 35 of the sleeve 34 and axially aligned with the axis of the sleeve is the collet 30. The collet 30 is of a conventional design having a forward end portion 48 including a rim 49 and an opposing tapered rear end portion 50 and circumferentially spaced vertical ribs 52 spaced apart by slits which surround an internal bore 56. The slits extend vertically substantially the entire distance between the extreme ends, 48 and 50, of the collet 30 and extend completely through a respective end of the collet. It will be appreciated that this structure allows the collet 30 to be radially compressed for purposes of holding the rod-like member 18 of the mining tool 14 therebetween. The collet 30 may be of a type commercially available from Kennametal Inc.

Threaded onto the collar 40 of the sleeve 34 is the collet closer 32. The collet closer 32 includes an annular housing 54 having a flange 58 including circumferentially spaced fingers 60. Formed within the annular housing 54 is an aperture 62 having an axis centrally aligned with the axis of the internal bore 56 of the collet 30. A detent ring 63 is formed within the interior sidewall of the aperture 62 for engaging the underside of the rim 49 of the forward end portion 48 of the collet 30 to retain the collet in a fixed position relative to the collet closer 32. The aperture 62 is of a stepped cross-sectional profile to provide an edge 64 for engaging the forward end portion 48 of the collet 30 as the collet closer is threaded onto the collar end 40. As shown in FIG. 2, preferably only the portion of the aperture 62 below the edge 64 is threaded to match the external threads 46 of the collar 40.

In a preferred embodiment, the minimum internal diameter of the aperture 62 of the collet closer 32 is less than the minimum compressed external diameter of the collet 30 to retain and compress the collet in position but still of a sufficient diameter to receive the rod-like member 18. Furthermore, the exterior diameter of the collet 30 should be suitably sized with respect to the internal diameter of the sleeve 34 so as to permit the collet to compress radially inward as the collet moves axially downward within the opening 35 of the sleeve 34.

In operation, the rod-like member 18 of the mining tool 14 is inserted into the bore 56 between the ribs of the collet 30 of the chuck assembly 12 and into the opening 35 of the sleeve 34 until the bottom of the rod-like member butts against the thrust washer 39. The collet closer 32 is then fixed rotationally in position. The collet closer may be fixed rotationally in position by most any suitable means such as by placing a wrench around the flange 58. In a preferred embodiment, a finger 60 of the collet closer 32 is engaged by a pawl 66 to prevent rotation of the collet closer. The pawl 66 slides radially within a housing 68 secured to the cover 24 of the container of the drive member 22 by manual operation of a handle 70. It will be appreciated that the pawl 66 may also be automated as known by one skilled in the art to improve efficiency of operation.

After the collet closer 32 is rotatably fixed in position, the hydraulic motor is actuated to cause the spindle 28 to rotate and thread with the collet closer. As the spindle 28 and collet closer 32 thread together the collet 30 is radially compressed within the top opening 35 of the spindle by the resistance of the edge 64 of the collet closer and the force of the tapered rear end portion 50 of the collet against the sidewalls of the opening of the sleeve 34. After the ribs of the collet 30 are sufficiently compressed around the rod-like member 18 to empower the rotation of the rod-like member the collet closer 32 is allowed to rotate freely with the spindle 28 and the mining tool 14 may be used for its intended purpose.

To disengage the rod-like member 18 of the mining tool 14 from the collet 30 the foregoing procedure is repeated only the direction of rotation of the spindle 28 is reversed by reversing the rotation of the source of rotary power. Reversing the direction of rotation of the spindle 28 unthreads the collet closer 32 from the spindle 28 and allows the collet to expand within the sleeve 34.

It will be appreciated that because the ribs of the collet 30 collapse uniformly around the rod-like member 18, the central axis of the rod-like member is mechanically concentrically aligned with the central axis of the spindle 28 such that manual alignment of each of the separate mechanical couplings of prior art mine drill boxes and mining tools is no longer necessary thereby substantially improving drilling efficiency and reducing mining costs. In addition, the chuck assembly 12 in accordance with the present invention provides a mine drill having the versatility to accommodate a wide variety of sizes and types of rod-like members 18. Furthermore, because the chuck assembly 12 is assembled from separate components the chuck assembly may be quickly and efficiently repaired when damaged by simply replacing the damaged component.

Having described presently preferred embodiments of the invention, it is to be understood that it may be otherwise embodied within the scope of the appended claims.

What is claimed is:
1. A drill box of a mine drill comprising:
a source of rotary power;

a drive member operatively connected to said source of rotary power to rotatably drive a chuck assembly having releasably secured therein a mining tool including a working end and a depending rod-like member, said chuck assembly including;

a spindle operatively connected to said drive member and having a sleeve of a cylindrical shape including a threaded collar end and a bottom end and an opening extending a selected distance from said collar end to said bottom end, a collet closer including an annular housing having an aperture threaded for threadingly engaging said threaded collar end, and a collet extending a selected distance within said opening of said sleeve, said collet having a forward end portion and an opposing tapered rear end portion and an internal bore capable of receiving the rod-like member of the mining tool, whereby said collet closes uniformly around the rod-like member of the mining tool as said collet is compressed within said opening of said sleeve by the action of said collet closer threadingly engaging said threaded collar end.

2. The drill box of claim 1 wherein said opening extends completely from said collar end to said bottom end.

3. The drill box of claim 2 wherein said opening is tapered a selected distance from said collar end to said bottom end.

4. The drill box of claim 3 wherein said sleeve further comprises a thrust washer fixed transverse a longitudinal length of said opening to prevent the rod-like member from projecting beyond said bottom end of said sleeve.

5. The drill box of claim 3 further comprising a flange projecting radially outwardly from said collar end and adapted to support said chuck assembly within a cavity formed in said drive member.

6. The drill box of claim 5 wherein said flange further comprises a ring member depending downwardly from a bottom surface of said flange, said ring member being rotatable within a groove of said drive member to seal said spindle with respect to said drive member.

7. The drill box of claim 6 wherein said annular housing of said collet closer includes a radially outwardly extending flange having circumferentially spaced fingers, said threaded aperture having a detent ring for engaging an underside of a rim formed around said forward end portion of said collet to retain said collet in a fixed position relative to said collet closer.

8. The drill box of claim 7 wherein said aperture is partially threaded and of a stepped cross-sectional profile to provide an edge for engaging said forward end portion of said collet as said collet closer is threaded onto said collar end.

9. The drill box of claim 8 wherein said threaded aperture is only threaded below said edge.

10. The drill box of claim 9 wherein said aperture minimum internal diameter is less than said collet minimum compressed external diameter.

11. A chuck assembly capable of releasably securing a mining tool including a working end and a depending rod-like member, the chuck assembly rotatably driven by a drive member operatively connected to a source of rotary power, the chuck assembly comprising:

a spindle operatively connected to said drive member and having a sleeve of a cylindrical shape including a threaded collar end and a bottom end and an opening extending a selected distance from said collar end to said bottom end;

a collet closer including an annular housing having an aperture partially threaded for threadingly engaging said threaded collar end; and a collet extending a selected distance within said opening of said sleeve, said collet having a forward end portion and an opposing tapered rear end portion and an internal bore capable of receiving the rod-like member of the mining tool, whereby said collet closes uniformly around the rod-like member of the mining tool as said collet is compressed within said opening of said sleeve by the action of said collet closer threadingly engaging said threaded collar end.

12. The chuck assembly of claim 11 wherein said opening is tapered a selected distance from said collar end to said bottom end.

13. The chuck assembly of claim 12 wherein said opening extends completely from said collar end to said bottom end.

14. The chuck assembly of claim 13 wherein said aperture is of a stepped cross-sectional profile to provide an edge for engaging said forward end portion of said collet as said collet closer is threaded onto said collar end, said aperture minimum internal diameter being less than said collet minimum compressed external diameter.

15. The chuck assembly of claim 14 wherein said sleeve further comprises a thrust washer fixed transverse a longitudinal length of said opening to prevent the rod-like member from projecting past said bottom end of said sleeve.

16. The chuck assembly of claim 15 further comprising a flange projecting radially outwardly from said collar end, said flange including a ring member depending downwardly from a bottom surface of said flange, said flange adapted to support said chuck assembly within a cavity formed in said drive member.

17. The chuck assembly of claim 16 wherein said ring member is rotatable within a groove formed on top of said drive member to seal said spindle with respect to said drive member.

18. The chuck assembly of claim 17 wherein said annular housing of said collet closer includes a radially outwardly extending flange having circumferentially spaced fingers, said aperture having a detent ring for engaging an underside of a rim formed around said forward end portion of said collet to retain said collet in a fixed position relative to said collet closer.

19. A method of mechanically gripping a rod-like member of a mining tool for power rotation by a drill box of a mine drill, the method comprising the steps of:

providing a spindle operatively connected to the drill box and having a sleeve of a cylindrical shape including a threaded collar end and a bottom end and an opening extending a selected distance from the collar end to the bottom end;

positioning a collet having a forward end portion and an opposing tapered rear end portion and an internal bore capable of receiving the rod-like member of the mining tool within the opening of the sleeve;

providing a collet closer including an annular housing having a partially threaded aperture for threadingly engaging the threaded collar end; and inserting the rod-like member of the mining tool through the aperture of the collet closer into the internal bore of the collet; and threading the collet closer on the collar end thereby compressing the collet within the opening of the sleeve to force the collet to close uniformly around the rod-like member of the mining tool.

20. The method of claim 19 further comprising the steps of:
fixing the rotation of the collet closer;
rotating the spindle to threadingly engage the collet closer thereby compressing the collet within the opening of the sleeve to force the collet to close uniformly around the rod-like member of the mining tool; and then
releasing the collet closer to rotate freely with the spindle as the spindle is power rotated by the drill box of the mine drill.

* * * * *